(12) United States Patent
Brown (10) Patent No.: US 7,234,898 B2
(45) Date of Patent: Jun. 26, 2007

(54) PNEUMATIC TRANSMISSION SYSTEM

(75) Inventor: Michael E. Brown, Kings Mill, OH (US)

(73) Assignee: E.F. Bavis & Associates, Inc., Maineville, OH (US)

(*) Notice: Subject to any disclaimer, the term of this patent is extended or adjusted under 35 U.S.C. 154(b) by 0 days.

(21) Appl. No.: 11/283,495

(22) Filed: Nov. 18, 2005

(65) Prior Publication Data

US 2007/0116528 A1    May 24, 2007

(51) Int. Cl.
*B65G 51/26* (2006.01)
(52) U.S. Cl. .................... 406/110; 406/13
(58) Field of Classification Search .............. 406/13, 406/110, 111, 112
See application file for complete search history.

(56) References Cited

U.S. PATENT DOCUMENTS

| | | | |
|---|---|---|---|
| 304,833 A * | 9/1884 | Leaycraft .................. 406/110 |
| 1,814,222 A * | 7/1931 | Morehouse ................ 406/112 |
| 2,811,393 A * | 10/1957 | Little ........................ 406/110 |
| 2,890,913 A * | 6/1959 | Miskel et al. ............. 406/110 |
| 3,306,555 A * | 2/1967 | Tonne ........................ 406/19 |
| 3,664,354 A * | 5/1972 | Minbiole et al. ........... 134/61 |
| 3,948,466 A | 4/1976 | Rudder et al. |
| 3,964,693 A | 6/1976 | Thomas |
| 3,985,316 A | 10/1976 | Weissmuller |
| 4,059,246 A | 11/1977 | Anders et al. |
| 4,135,684 A | 1/1979 | Willey |
| 4,180,354 A * | 12/1979 | Greene ...................... 406/112 |
| 4,251,169 A | 2/1981 | Kelley et al. |
| 4,315,704 A | 2/1982 | Kelley et al. |
| 4,339,228 A | 7/1982 | Kelley et al. |
| 4,352,603 A | 10/1982 | Anders |
| 4,407,613 A * | 10/1983 | Jones ......................... 406/84 |
| 4,462,721 A | 7/1984 | Anders et al. |
| 4,482,294 A | 11/1984 | Kelley et al. |
| 4,512,688 A | 4/1985 | Hochradel |
| 4,540,317 A | 9/1985 | Vogel |
| 4,710,098 A | 12/1987 | Anders et al. |
| 4,715,750 A | 12/1987 | Podoll et al. |
| 4,792,263 A | 12/1988 | Podoll |
| 4,930,941 A | 6/1990 | Willey et al. |
| 4,971,481 A | 11/1990 | Foreman |
| 4,984,939 A | 1/1991 | Foreman et al. |
| 5,127,773 A | 7/1992 | Foreman et al. |
| 5,131,792 A | 7/1992 | Grosswiller et al. |
| 5,181,806 A | 1/1993 | Grosswiller et al. |
| 5,209,609 A | 5/1993 | Lang |
| 5,234,292 A * | 8/1993 | Lang .......................... 406/1 |
| 5,299,891 A | 4/1994 | Grosswiller et al. |
| 5,473,114 A * | 12/1995 | Vogel ......................... 174/47 |
| 5,562,367 A | 10/1996 | Scott |
| 5,564,868 A * | 10/1996 | Vogel et al. ............... 406/112 |
| 5,735,644 A | 4/1998 | Grosswiller et al. |
| 5,816,443 A | 10/1998 | Bustos |
| 6,039,510 A | 3/2000 | Greene et al. |
| 6,056,483 A * | 5/2000 | Nakamura et al. ......... 406/134 |
| 6,146,057 A | 11/2000 | Gromley et al. |
| 6,877,933 B2 * | 4/2005 | Ho et al. ................... 406/180 |

* cited by examiner

*Primary Examiner*—Joe Dillon, Jr.
(74) *Attorney, Agent, or Firm*—Dinsmore & Shohl LLP (57) ABSTRACT

A pneumatic transmission system includes a first terminal, a second terminal, and a transmission conduit connecting the first and second terminals in fluid communication with each other. The pneumatic transmission system may include a first blower directly connected to the transmission conduit and configured to create a vacuum within the transmission conduit between the first terminal and a carrier, and a second blower directly connected to the transmission conduit and configured to create a vacuum within the transmission conduit between the second terminal and a carrier. The pneumatic transmission system may include first and second end doors that are configured to move to open or close the first and second end openings.

24 Claims, 12 Drawing Sheets

PNEUMATIC TRANSMISSION SYSTEM

FIELD OF THE INVENTION

The present invention generally relates to pneumatic transmission systems. More particularly, the present invention relates to a pneumatic tube transmission system for banks, pharmacies, and other such commercial establishments.

BACKGROUND OF THE INVENTION

Pneumatic transmission systems are typically used to transmit articles from a first location to a second location which is remote from the first location. Pneumatic transmission systems usually include at least two stations, a tube or conduit extending between the two stations and a carrier positioned within the tube so as to be delivered by pneumatic pressure. The pressure can be a subatmospheric pressure or a superatmospheric pressure.

Generally pneumatic transmission systems are used in "drive-thru" terminals for bank facilities, pharmacies, etc., where business is conducted via a carrier transmitted between the bank and the remote "drive-thru" terminal. Other exemplary uses include sending documents between floors in a building, or from one office to another office located some distance apart.

These pneumatic systems include either one or two blowers to create a differential pressure across the carrier to push or pull the carrier from a first terminal within a transmission conduit to a second terminal. In the systems that use one blower, the blower operates to create a vacuum to pull the carrier in one direction and operates to push (create positive pressure) the carrier in the opposite direction. Such continued forward and reverse operations are hard on the blower, which causes these blowers to experience relatively high maintenance requirements and shortened life spans.

In the prior art systems that include two blowers, generally the blowers are separated a substantial distance from the carrier transmission conduit and only connected to the carrier transmission conduit via a secondary conduit system. The blowers either draw or blow air through the secondary conduit system out of or into the carrier transmission conduit system to create the vacuum or positive pressure within the carrier transmission conduit, respectively. The secondary conduit system due to frictional losses requires larger blowers to be used, which unnecessarily increases the cost of implementation and operation of such pneumatic transmission systems.

Additionally, the prior art pneumatic transmission systems include doors to permit the carrier to be inserted or removed from the transmission system at either terminal. These doors are generally configured such that they have large and/or complicated sealing surfaces. Such sealing surfaces on the doors increase the costs of implementation and operation as well as cause sealing issues due to improper seal seating or excessive wear. Also, such conventional systems require additional valve systems to permit air to be drawn into and exhausted out of the transmission conduit, which also increases system reliability issues and maintenance expenses.

Accordingly, there is a need for an improved pneumatic transmission system.

SUMMARY OF THE INVENTION

Accordingly, the present invention is intended to address and obviate problems and shortcomings and otherwise improve previous pneumatic transmission systems.

One exemplary embodiment of the present invention is a pneumatic transmission system that includes a first and second terminals for sending and receiving a carrier, a transmission conduit connecting the first and second terminals in fluid communication with each other, first blower directly connected to and in fluid communication with the transmission conduit such that first blower is operable to create a vacuum within the transmission conduit between the first terminal and a carrier, and a second blower directly connected to and in fluid communication with the transmission conduit such that the second blower is operable to create a vacuum within the transmission conduit between the second terminal and a carrier. The pneumatic transmission system is configured to transport a carrier between the first and second terminals.

Another exemplary embodiment of the present invention is a pneumatic transmission system that includes first and second terminals for sending and receiving a carrier and a transmission conduit connecting the first and second terminals in fluid communication with each other and having a first end opening and a second end opening disposed at opposite ends of the transmission conduit. The pneumatic transmission system also includes a first blower in fluid communication with the transmission conduit and configured to move a carrier within the transmission conduit between the first and second terminals and first and second end doors configured to movingly engage the transmission conduit at the first and second end openings, respectively.

Still another exemplary embodiment of the present invention is a pneumatic transmission system that includes first and second terminals for sending and receiving a carrier, a transmission conduit connecting the first and second terminals in fluid communication with each other and having a first opening disposed at the first terminal and a second opening disposed at a second terminal, a first blower in fluid communication with the transmission conduit and configured to create a vacuum within the transmission conduit, a second blower in fluid communication with the transmission conduit and configured to create a vacuum within the transmission conduit, a first door configured to open and close the first opening in order to insert or remove a carrier from the conduit at the first terminal, and a second door configured to open and close the second opening in order to insert or remove a carrier from the conduit at the second terminal. The pneumatic transmission conduit also comprises at least one venting port disposed at each of the first and second terminals. The first and second doors are configured to move to a position such that the first and second doors close the first and second openings but permit air to flow from outside the transmission conduit to an interior space of the transmission conduit. The first and second openings are configured such that a carrier may be inserted into or removed from the openings. The transmission system is configured to transport a carrier between the first and second terminals.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

The present invention provides a pneumatic transmission system for transferring items between a teller terminal and a customer terminal at a commercial facility such as a bank or pharmacy during a transaction. While the exemplary embodiments illustrated herein describe pneumatic tube transmission systems, as will be apparent to those of ordinary skill in the art the present invention may be employed in other transmission systems as well.

Referring to FIGS. 1-13D, an exemplary embodiment of a pneumatic transmission system 10 of the present invention is shown. Pneumatic transmission system 10 generally including a teller terminal 12, a customer terminal 14, a transmission conduit 20 having a teller terminal end opening ("teller opening") 23 and a customer terminal end opening ("customer opening") 24, a first blower 30 in fluid communication with transmission conduit 20, a second blower 40 in fluid communication with transmission conduit 20, a teller terminal end door ("teller door") 70 configured to open and close teller end opening 23, and a customer end door ("customer door") 80 configured to open customer end opening 24. As shown in the exemplary embodiment, teller terminal 12 may be positioned inside a building (e.g., a bank) such that a teller may insert and/or remove a carrier 5 from pneumatic transmission system 10 to transport and/or receive items inside carrier 5 from a customer located at customer terminal 14. Teller terminal 12 may comprise additional items such as conventional teller windows, intercom system, slide drawer, etc., as known to one of ordinary skill in the art. In addition, customer terminal 14 may comprise an intercom system and other conventional customer terminal components as known to one of ordinary skill in the art without departing from the spirit and scope of the present invention. Customer terminal 14 may be positioned a spaced-apart distance from teller terminal 12. For example, generally customer terminal 14 is spaced at least a car lane distance (e.g., slightly greater than a width of an automobile) from teller terminal 12, and any additional customer terminals may be placed an additional car lane distance from first customer terminal 14.

Transmission conduit 20 may comprise any conventional or yet-to-be developed pneumatic transmission conduit as known to one of ordinary skill in the art. Such a transmission conduit may be fabricated from a variety of known materials such as metal, plastics, composites, combinations thereof, or any other conventional materials as known to one of ordinary skill in the art. In addition, the conduit may have a variety of shapes and sizes without departing from the spirit and scope of the present invention. The conduit may be colored, opaque, translucent or any combination thereof. In the exemplary embodiment shown, transmission 20 is a tubular conduit made from metal. Transmission conduit 20 has a length sufficient enough to connect teller terminal 12 with customer terminal 14. As described above, it is understood that pneumatic transmission system 10 may include more than one customer terminal, and thus transmission conduit 20 may connect teller terminal 12 to more than one customer terminal.

Transmission conduit 20 includes sidewall 21 that defines an interior space 22 configured to permit carrier 5 to travel therein. Since transmission conduit 20, in this one exemplary embodiment, is tubular, teller and customer end openings 23 and 24 are circular in shape. Transmission conduit 20 has a first straight portion 25 that extends upward from teller end opening 23 and connects to a first elbow 26. A second straight portion 27 connects to first elbow 26 opposite first straight portion 25. A second elbow 28 connects to second straight portion 27 opposite first elbow 26. Second elbow 28 connects to a third straight portion 29 opposite second straight portion 27. Third straight portion 29 extends from second elbow 28 downwardly to customer end opening 24.

First and second blowers 30 and 40 may be any convention blowers as known to one of ordinary skill in the art without departing from the spirit and scope of the present invention. First and second blowers 30 and 40 may comprise an impellor (not shown) driven by a motor (not shown). First and second blowers 30 and 40 may comprise a tangential blower, which has benefits over prior art centrifugal blowers generally used in pneumatic transmission systems. In the exemplary embodiment, first and second blowers 30 and 40 may be any vacuum blower such as 2-stage, by-pass, ball/ball, tangential discharge blower, model number 116353-00, commercially available from AMETEK, LAMB Electric Division of Kent, Ohio. Such a blower may include a 220 volt motor. Such a tangential blower provides for the air to flow from an inlet around (tangentially) the stator and/or rotor of the motor to an outlet, preventing dirt and debris from damaging the stator and rotor of the motor. In contrast, centrifugal blowers blow the air (and dirt and debris) through the stator and/or rotor, thus damaging and/or reducing the potential life of the blower.

Each of first and second blowers 30 and 40 include first and second inlets 31 and 41 and first and second outlets 32 and 42, respectively. First and second outlets 32 and 42 may include first and second check valves 34 and 44 located at the outlets, respectively, to permit air to exhaust from transmission conduit 20 through first and second blowers 30 and 40, but not allow air and debris to enter through the outlets into the blowers and transmission conduit 20. In the exemplary embodiment, check valves 34 and 44 may comprise ball and cage check valves, wherein cages 36 and 46 are positioned over respective blower outlets 32 and 42 and balls 38 and 48 are located within the cages. Such a ball and cage check valve functions as any conventional check valve known to one of ordinary skill in the art.

For example, when first blower 30 is operating (drawing a vacuum in transmission conduit 20), it will exhaust air from transmission conduit 20 via first outlet 32 through first check valve 34 (ball 38 will be unseated from first outlet 32). In this example, second blower 40 will not be operating and thus second check valve 44 will be in its normally-closed position (ball 48 sealing off second outlet 42), preventing air from being drawn into transmission conduit 20 through second blower 40. However, when first blower 30 stops its operation and second blower 40 begins to operate, the opposite of the operation set forth above takes place. For example, second blower 40 begins drawing air out of transmission conduit 20 and exhausting it through second outlet 42, forcing second check valve 44 open (ball 48 is unsealed from second outlet 42), while simultaneously first check valve 34 moves back to its normally-closed position (ball 38 sealed against first outlet 32). In its normally-closed position, first check valve 34 prevents air from being drawn into transmission conduit 20 through first blower 30.

In the exemplary embodiment, first and second blowers 30 and 40 are directly connected to transmission conduit 20, placing both blowers in fluid communication with transmission conduit 20. Such direct connection of the blowers to transmission conduit 20 reduces losses found in prior art pneumatic transmission systems, wherein the blowers were spaced a distance from the transmission conduit and connected to a transmission conduit via a secondary conduit. Such secondary conduit added losses to the transmission system. As used herein, direct connection is defined as being connected such that there is no significant distance between the blower and transmission conduit 20, i.e., no secondary conduit connecting the two. For example, first and second blowers 30 and 40 are directly connected to first and second elbow 26 and 28 of transmission conduit 20, respectively, using a connection device (e.g., first clamp 50 and second clamp 60, described below herein) to hold first and second blowers 30 and 40 to and place it in fluid communication with transmission conduit 20.

Figure 11:
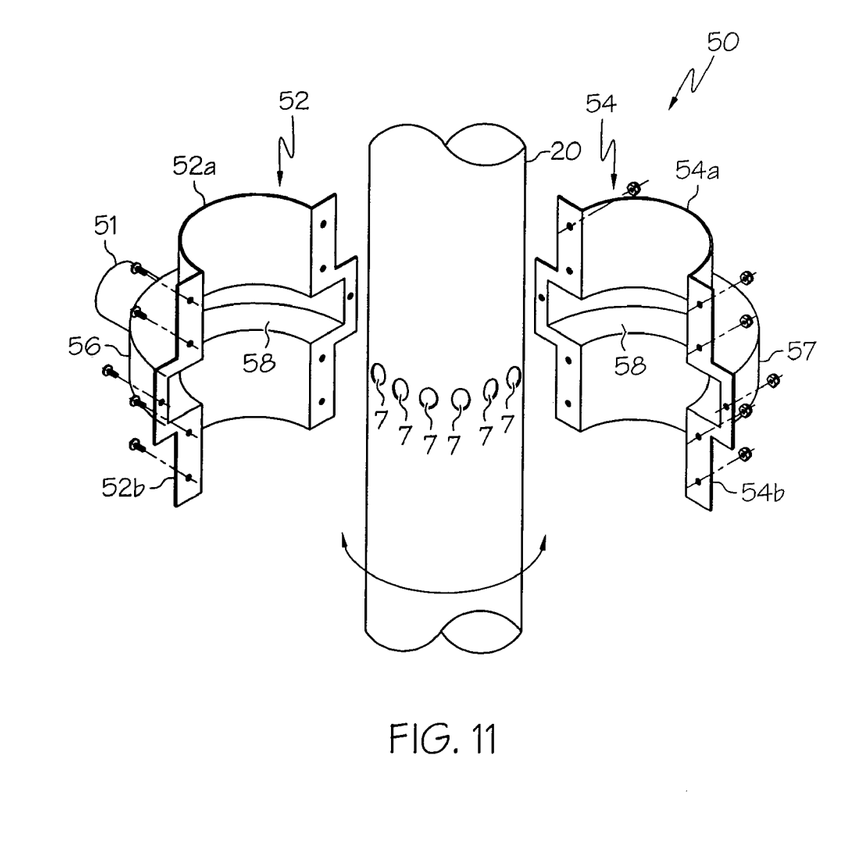
FIG. 11 is a perspective view of an exemplary embodiment of the clamp and transmission conduit according to the present invention illustrated in FIG. 1.
Figure 12:
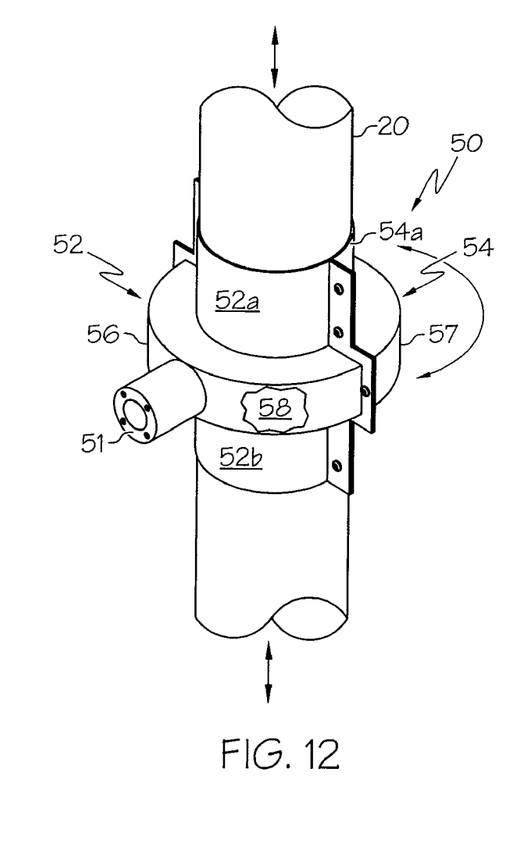
FIG. 12 is a perspective view of an exemplary embodiment of the clamp and transmission conduit according to the present invention illustrated in FIG. 1.

First and second clamps 50 and 60, in the exemplary embodiment, may comprise a banjo-style clamp as describe below. For purposes of illustration only, and not limitation, the first and second clamps will be described in reference to first clamp 50 as shown in FIGS. 11 and 12. First clamp 50 includes two clamp sides (e.g., left clamp side 52 and right clamp side 54) that include binding sections 52a, 52b, 54a, and 54b. and mid-sections (e.g., left mid-section 56 and right mid-section 57). When first clamp 50 is positioned around a section of transmission conduit 20 the mid-sections 56 and 57 define an annular cavity 58 between an outer surface of transmission conduit 20 and an interior surface of mid-sections 56 and 57. Further, binding sections 52a, 52b, 54a, and 54b clamp down and seal against the outer surface of transmission conduit 20, preventing air from escaping past the binding sections. Such sealing may be any conventional seals as known to one of ordinary skill in the art and need not be described herein. It is understood that any conventional method or device may be used to bind, clamp, and/or connect first and second clamps 50 and 60 to transmission conduit 20 as known to one of ordinary skill in the art and need not be described herein.

Figure 1:
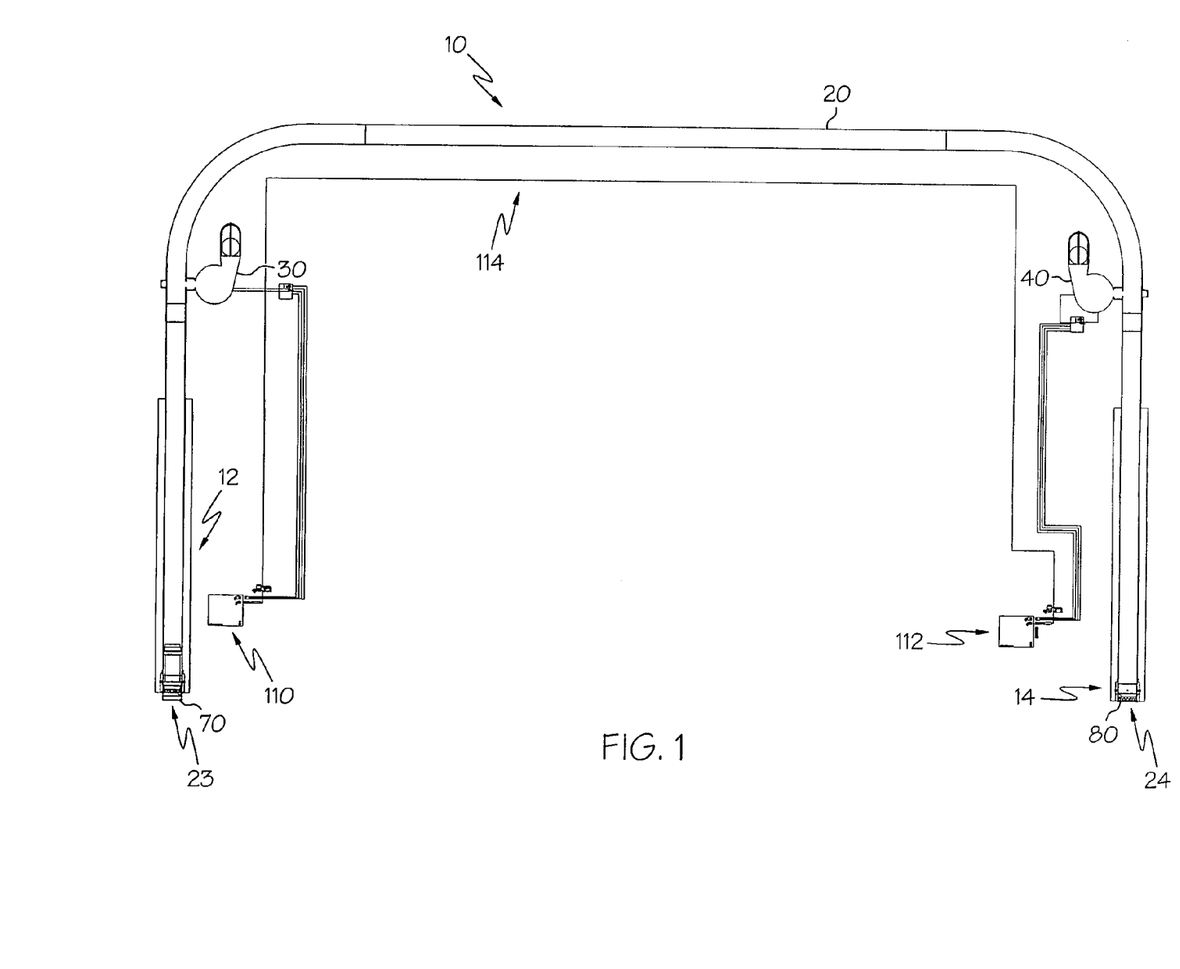
FIG. 1 is a schematic representation of an exemplary embodiment of the pneumatic transmission system according to the present invention.
Figure 2:
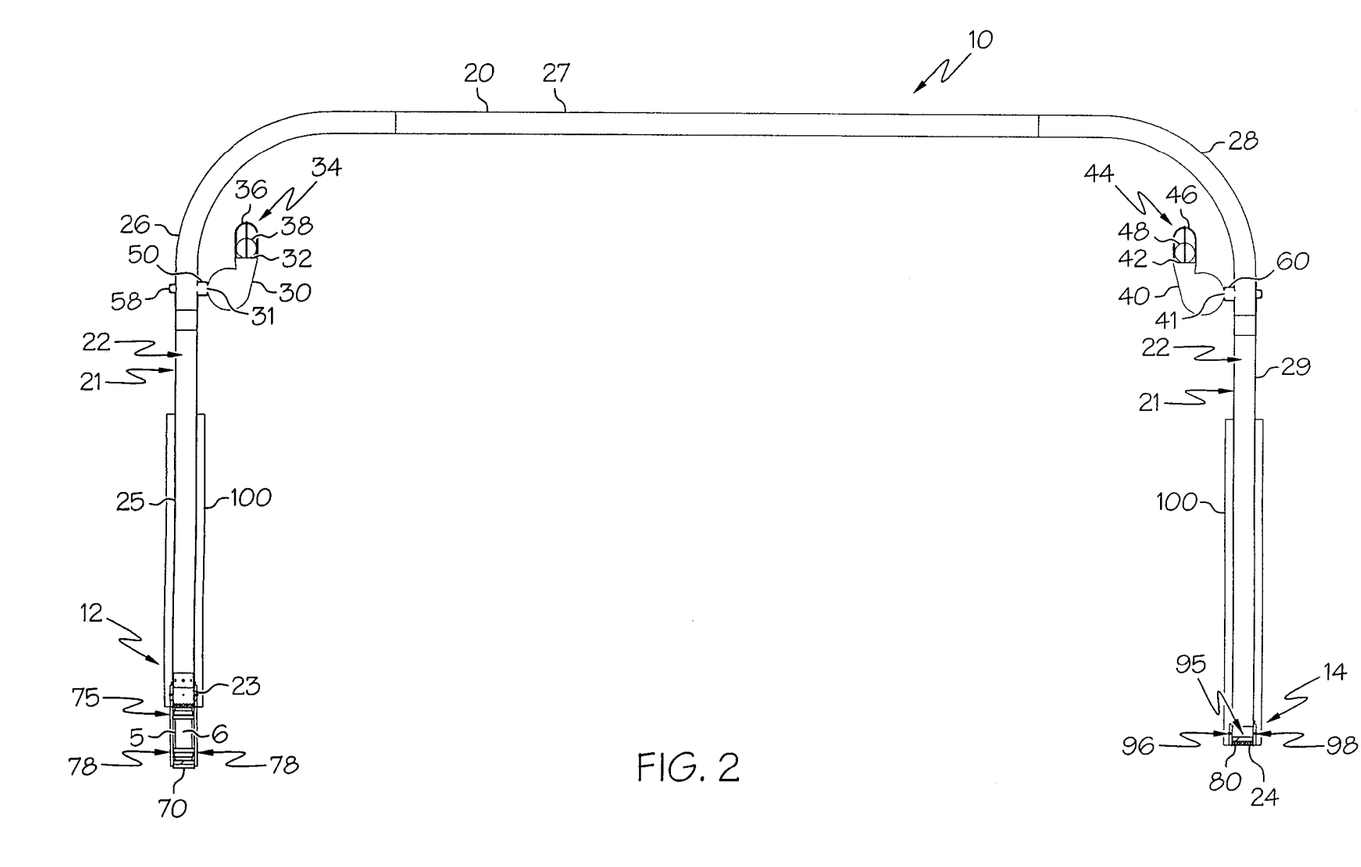
FIG. 2 is a schematic representation of the pneumatic transmission system illustrated in FIG. 1, showing the teller door in the "open" position for loading and/or or unloading of a carrier, and the customer door in the closed position.

First and second blowers 30 and 40 may be connected to first and second clamps 50 and 60, respectively, such that respective first and second inlets 31 and 41 are in fluid communication with the respective annular cavities (e.g., cavity 58) of first and second clamps 50 and 60. As shown in FIG. 2, for example, first inlet 31 is connected to first clamp inlet 51 such that first blower 30 is directly connected to transmission conduit 20, placing first blower 30 in fluid communication with annular cavity 58. In addition, wherever it is desired to directly connect first and second blowers 30 and 40 to transmission conduit 20, at least one aperture 7 per blower is disposed in sidewall 21 as shown in FIG. 11. Thus, for example, first clamp 50 is positioned on transmission conduit 20 such that annual cavity 58 is disposed over apertures 7, thus placing first blower 30 in direct fluid communication with interior space 22 of transmission conduit 20. Such direct fluid communication between the blower and the transmission conduit reduces flow losses, which permits the reduction in blower size and produces a more efficient pneumatic transmission system 10. It is understood that although first clamp 50 is described above, second clamp 60 may be identical to first clamp 50 and placed over a second aperture(s) along transmission conduit 20 where it is desired to position second blower 40. Again, it should also be understood that although first and second clamps 50 and 60 have been described with reference to a specific banjo-style clamp, other conventional connection devices may also be used as known to one of ordinary skill in the art.

Figure 13A:
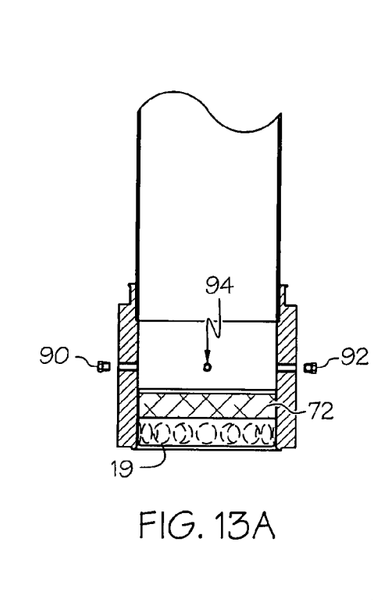
FIG. 13A is a schematic representation of an exemplary embodiment of the teller terminal end door in a "closed" position according to the present invention illustrated in FIG. 6.
Figure 13B:
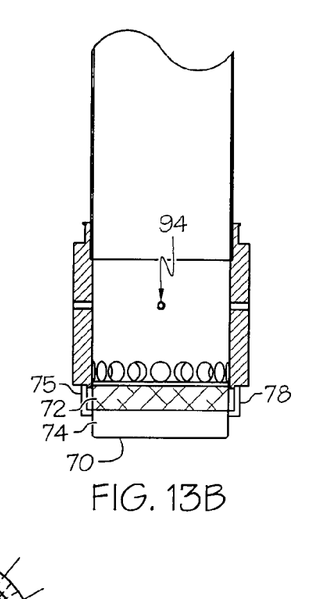
FIG. 13B is a schematic representation of an exemplary embodiment of the teller terminal end door in a "closed but vented" position according to the present invention illustrated in FIG. 4.
Figure 13C:
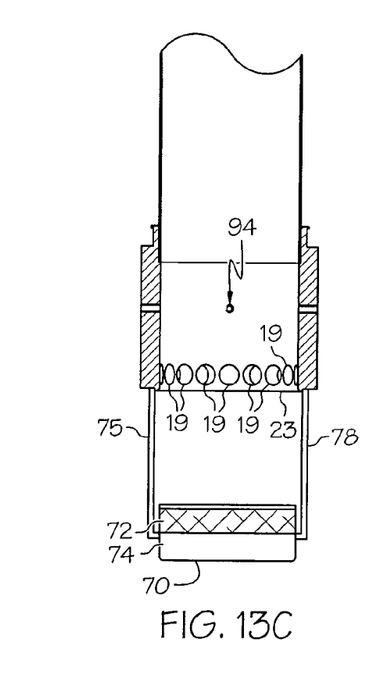
FIG. 13C is a schematic representation of an exemplary embodiment of the teller terminal end door in an "open" position according to the present invention illustrated in FIG. 2.
Figure 13D:
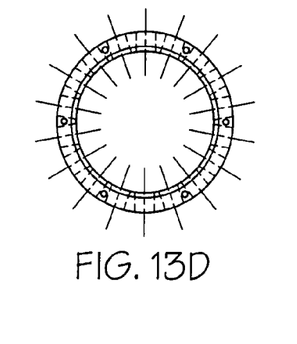
FIG. 13D is a cross-sectional view of the teller terminal end door according to the present invention illustrated in FIG. 13A.

As set forth above, pneumatic transmission system 10 may also include teller door 70 and customer door 80 that are configured to open and close teller opening 23 and customer opening 24, respectively. Teller door 70 and customer door 80 are circular in shape and include a seal positioned along the outer annular face of the doors. For example, as shown in FIGS. 13A-13D, teller door 70 includes a seal 72 positioned along an annular face 74 and comprises a circular shape (FIG. 13D). One exemplary seal that may be used is a VELCRO seal as known to one of ordinary skill in the art. Other conventional seals as known to one of ordinary skill in the art may also be used with the present invention. It is understood that customer door 80 may be similar or the same as teller door 70 and thus include a seal positioned on an annular face. Teller terminal 12 and customer terminal 14 may include one or more venting ports (e.g., ports 19, FIGS. 13A-13C) disposed through sidewall 21. The ports are configured to permit the proper volume of air to enter into interior space 22 of transmission conduit 20 from outside transmission conduit 20. When this volume of outside air enters into transmission conduit 20, it is substantially at atmospheric pressure and will push carrier 5 within transmission carrier 20 when a vacuum is drawn on a side of carrier 5 opposite the venting ports.

Teller door 70 and customer door 80 may include a teller door actuator and a customer door actuator that movably connect the doors to the respective terminals 12 and 14. Such actuators are configured to move teller door 70 and customer door 80 between at least three positions: 1) a closed position (e.g., FIG. 13A); 2) a closed but vented position (e.g., FIG. 13B); and 3) an open position (e.g., FIG. 13C). For example, as shown in FIGS. 13A-13C, teller terminal 12 may include teller door actuator 75 that movably connects teller door 70 to teller terminal 12. Teller door actuator 75 may include rods 78 that extend to move teller door 70 outwardly from teller opening 23 (e.g., un-plug teller door 70 from teller opening 23), thus opening transmission conduit 20 at teller terminal 12 (e.g., open position, FIG. 13C). In addition, rods 78 of teller door actuator 75 may retract inwardly to move teller door 70 toward teller opening 23 until it seals teller opening 23 (e.g., plugs teller door 70 into teller opening 23). When in this position, seal 72 seats (e.g., seals) against sidewall 21, preventing ambient air (e.g., air from outside transmission conduit 20) from entering into interior space 22 through either teller end opening 23 or venting port(s) 19 (e.g., closed position, FIG. 13A).

Door actuator 75 may extend the rods 78 a short distance outwardly such that seal 72 moves away from port(s) 19 but remains sealed against sidewall 21 (e.g., closed but vented position, FIG. 13B). Thus, the "closed but vented" position permits ambient air to enter interior space 22 through port(s) 19, but prevents ambient air from entering through teller opening 23. This position provides for a controlled amount of air intake into transmission conduit 20 (providing the proper air volume and pressure behind carrier 5). The same configuration as described with reference to teller door 70 may be used for customer door 80 and customer terminal 14. This configuration of doors 70 and 80 permits the end doors to function as valves to pneumatic transmission system 10, thus eliminating the need for separate control valves as found in prior art systems. This reduces the cost of fabrication and operation as well as lowers maintenance requirements. The door actuators may comprise a solenoid, pneumatic, or other conventional drive mechanisms as known to one of ordinary skill in the art. In another exemplary embodiment, the teller door and customer door seat up against the end of sidewall 21, closing off both end openings, versus physically inserting themselves into the openings as described in the exemplary embodiment set forth above.

Pneumatic transmission system 10 may also include a variety of conventional sensors such as pressure sensitive sensors, photo eye sensors, resistivity sensors, etc., as known to one of ordinary skill in the art. For example, pneumatic transmission system 10 may include at both, teller terminal 12 and customer terminal 14, a photo eye sensor (e.g., teller photo eye transmitter 90 and receiver 92 (FIG. 13A) and customer photo eye transmitter 96 and receiver 98 (FIG. 2)) to detect the presence of carrier 5 when it is in the terminals and a pressure sensor (e.g., teller pressure sensor 94 (FIG. 13A) and customer pressure sensor 95 (FIG. 2)) to detect when carrier 5 passes the blower drawing a vacuum in transmission conduit 20 (e.g., first blower 30 when traveling from customer terminal 14 to teller terminal 12 or second blower 40 when traveling from teller terminal 12 to customer terminal 14) in order to shut off the respective blower in order to reduce unnecessary blower operation. As carrier 5 passes the blower drawing the vacuum, it causes a change in pressure within transmission conduit 20, which is detected by the respective pressure sensor (e.g., teller pressure sensor 94 or customer pressure sensor 95)

Pneumatic transmission system 10 may also include a housing 100 located at each terminal 12 and 14. Housing 100 may be fabricated from a variety of conventional materials as known to one of ordinary skill in the art, including but not limited to metals (e.g., sheet metal, aluminum, etc.), plastics (e.g., vinyl, LDPE, etc.), woods, composite materials, or any combination thereof. Housing 100 may be connected and sealed to sidewall 21 at teller terminal 12 and customer terminal 14 to create an air tight seal around sidewall 21. Such connections may be air-tight in order to prevent air from being drawn into or blown out of pneumatic transmission system 10 at the terminal and customer terminals except at housing openings 104.

Figure 3:
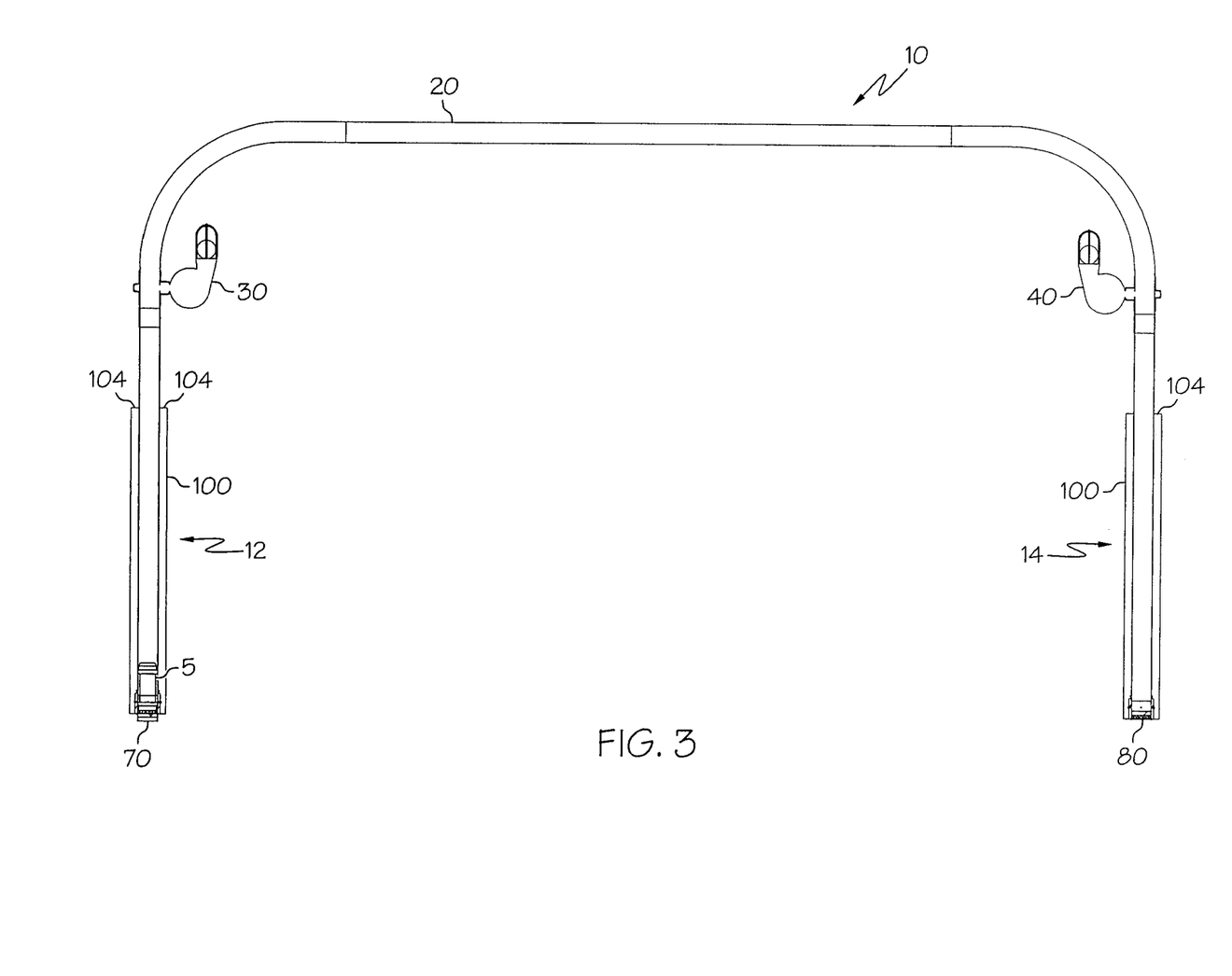
FIG. 3 is a schematic representation of the pneumatic transmission system illustrated in FIG. 1, showing the teller door in the "closed but vented" position, and the customer door in the "closed" position.

Housing 100 extends upward from teller and customer terminals 12 and 14, encompassing transmission conduit 20, and venting port(s) 19 to housing openings 104 as shown in FIG. 3. Housing 100 may function as a plenum for pneumatic transmission system 10, drawing in and exhausting out air for pneumatic transmission system 10 at a location raised above teller and customer terminals 12 and 14. Housing 100 is configured with sufficient volume to reduce the noise created by air flowing within it. In the exemplary embodiment, housing 100 extends upward into the ceiling of a facility's structure such that housing opening 104 is positioned above the ceiling and thus above the terminal ends and any cars within the drive-thru lane. Such a configuration lowers the noise level of the system because the air intake and exhaust of the system are raised above the teller and customer terminals 12 and 14. It also reduces the drawing in of dirt, debris, and vehicle exhaust into the system because of this raised elevation. In another exemplary embodiment, housing 100 may extend such that it encompasses both first and second blowers 30 and 40, wherein the blowers exhaust air from transmission conduit 20 out of first and second blower outlets 32 and 42, into housing 100, and then out of housing opening 104.

Figure 4:
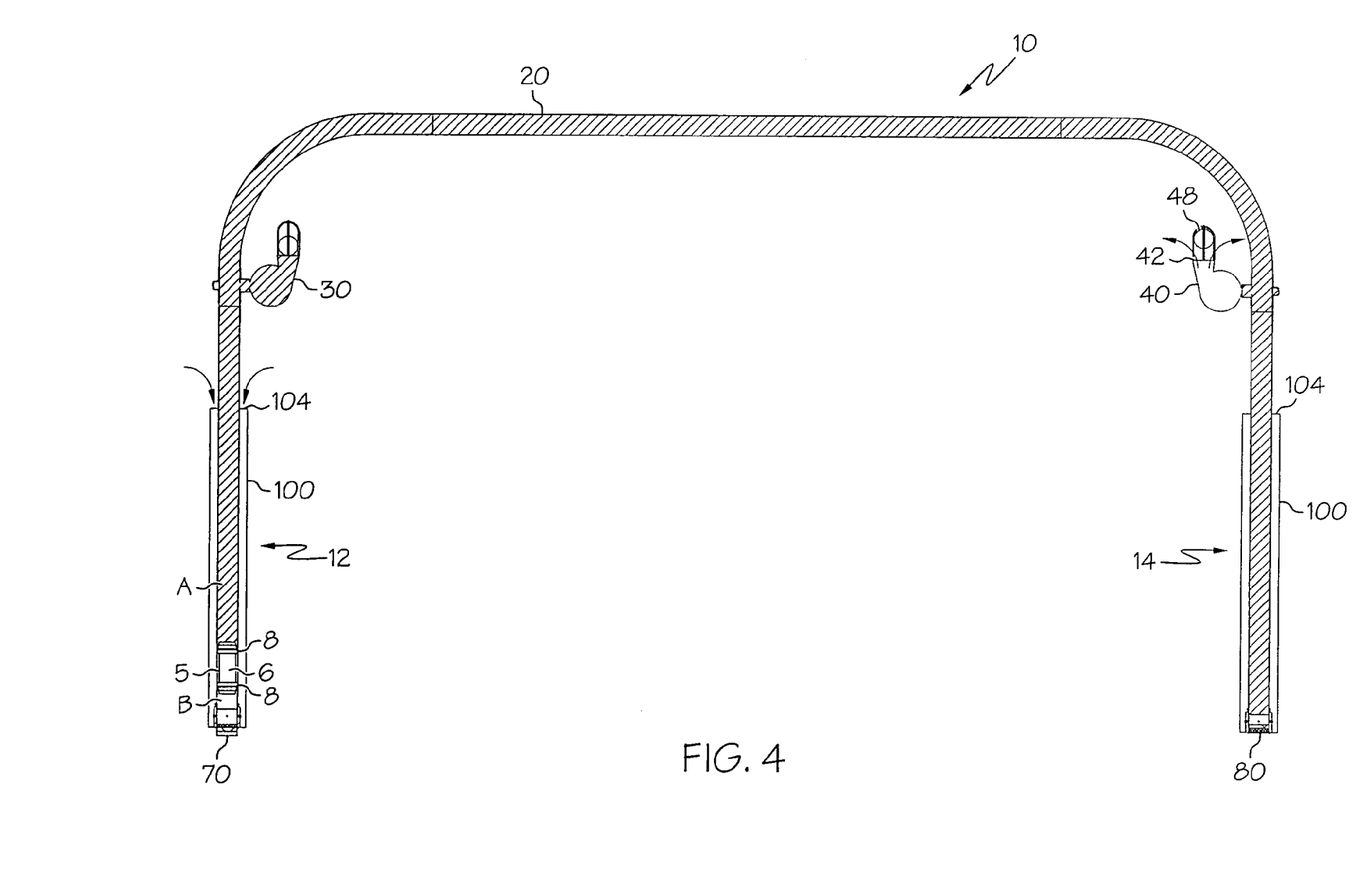
FIG. 4 is a schematic representation of the pneumatic transmission system illustrated in FIG. 1, showing a vacuum in space A between the customer terminal and a carrier.

As described above, pneumatic transmission system 10 and all its components are configured to transport carrier 5 between teller terminal 12 and customer terminal 14 within transmission conduit 20 using air (pressure differential within the transmission conduit). Referring to FIG. 4, carrier 5 may be any conventional carrier used in pneumatic transmission systems as known to one of ordinary skill in the art. In the exemplary embodiment, carrier 5 is a cylindrical-shaped carrier having a cavity 6 and a door (not shown) to allow entry into cavity 6. In addition, carrier 5 may include two annular carrier seals 8 disposed along the outer wall of carrier 5 at each of its ends. Seals 8 create a seal between carrier 5 and the interior surface of sidewall 21 of transmission conduit 20. Seals 8 may comprise any conventional sealing device or methods as known to one of ordinary skill in the art. In this exemplary embodiment, seal 8 is fabricated from VELCRO material. Seals 8 are configured to allow some controlled leaking between carrier 5 and the interior surface of sidewall 21. Such controlled leaking will permit a certain amount of air to pass from one side (A) of carrier 5 (e.g., customer terminal 14) to the opposite side (B) of carrier 5 (e.g., teller terminal 12), which will be described below herein.

Pneumatic transmission system 10 may also include a teller user interface (not shown) and a customer user interface (not shown), both of which permit the teller and/or customer to send carrier 5 to the opposite terminal end and to communicate with each other. For example, teller and customer user interfaces may include a "send" push button (not shown) to initiate the operation of the system to transmit carrier 5 to the opposite terminal end and a "speak" push button to operate an intercom system. Such user interfaces may be any conventional user interface as known to one of ordinary skill in the art and need not be described herein.

Referring back to FIG. 1, in an exemplary embodiment of the present invention, distributed processing is used to control the pneumatic transmission system 10. Pneumatic transmission system 10 includes two microprocessor controls: a teller end controller 110 and a customer end controller 112. The microprocessor controllers are located at each end of the transmission conduit 20 and are connected to each other with a single bi-directional communication cable 114. Teller end and customer end controllers 110 and 112, respectively, may process the signals from the sensors (e.g., teller photo eye transmitter 90 and receiver 92, customer photo eye transmitter 96 and receiver 98, and teller and customer terminal pressure sensors 94 and 95) and switches and send control signals to control the components of system 10 such as teller actuator 75, customer actuator 85, and first and second blowers 30 and 40, respectively. The teller and customer end controllers may also be electrically connected to the customer user interface (not shown). As set forth above, the controllers are configured to receive signals from the teller and/or customer photo eye sensors when either sensor detects the presence of carrier 5 in its respective terminal (e.g., teller terminal 12). Upon receipt of the signal, the controller (e.g., teller end controller 110) may send a control signal to its respective actuator (e.g., teller actuator 75) located at the terminal (e.g., teller terminal 12) that the carrier has been detected and to open the respective door (e.g., teller door 70). Once the door is open, it permits the removal of carrier 5 from transmission conduit 20.

The controllers may also be configured to receive one or more signals from either of the pressure sensors (e.g., teller pressure sensor 94 or customer pressure sensor 95), and then send a corresponding control signal(s) to stop or start the respective blower (e.g., first blower 30 or second blower 40). Also, the controllers may be configured to operate teller door actuator 75 and customer door actuator 85 to move teller door 70 and customer door 80 between the three positions: 1) "closed" position; 2) "closed but vented" position; and 3) "open" position. The control system may include and be connected to a step down transformer (not shown) in order to make the control system a low voltage system, eliminating the need for large conductors and excessive voltage drops if the system is long. It is understood that other conventional control systems may be used as known to one of ordinary skill in the art without departing from the spirit and scope of the present invention.

Referring back to FIGS. 1-10, an exemplary embodiment of pneumatic transmission system 10 in operation will be described. Assuming teller door 70 is in the "open" position and customer door 80 is in the "closed" position (FIG. 2), a user may place carrier 5 onto teller door 70 and activate the system 10 (e.g., by pressing a "start" or "send" button (not shown) located on a teller user interface) to transmit carrier 5 from teller terminal 12 to customer terminal 14. When teller end controller 110 receives the "send" control signal from the teller user interface, it operates teller door actuator 75 to move teller door 10 to the "closed but vented" position, which inserts carrier 5 into teller opening 23 of transmission conduit 20 (FIG. 3).

Figure 5:
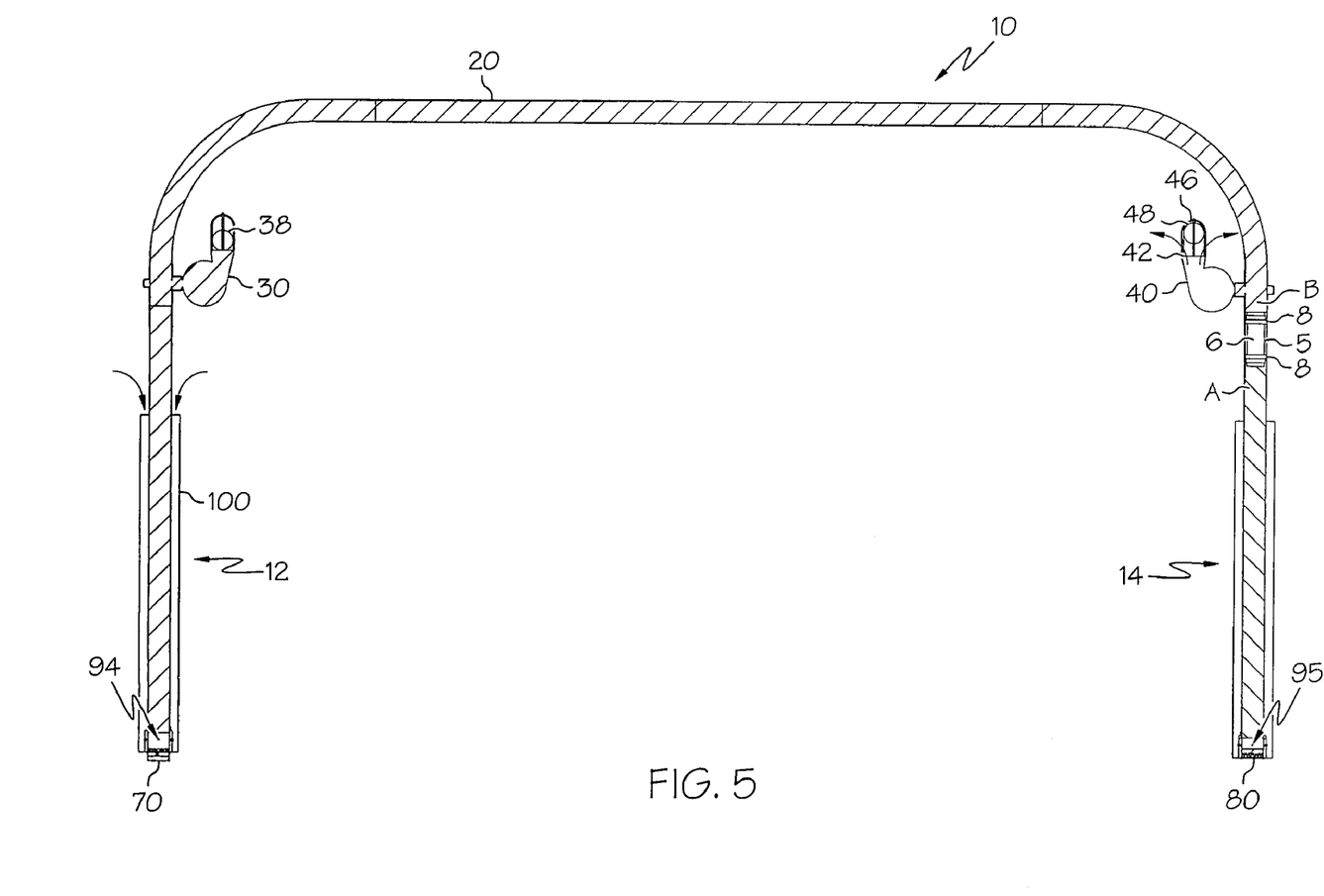
FIG. 5 is a schematic representation of the pneumatic transmission system illustrated in FIG. 1, showing a carrier traveling with the conduit just past the second blower.

Once teller end door 70 is in this position, customer end controller 112 initiates the operation of second blower 40, which begins to draw a vacuum within interior space 22 between customer terminal 14 and carrier 5 (customer terminal side (A)) as shown in FIG. 4. As described above, port(s) 19 permit ambient air to enter interior space 22 between teller door 70 and carrier 5 (teller terminal side (B)), placing this area of transmission conduit 20 at atmospheric pressure (e.g., positive pressure). This pressure differential within transmission conduit 20 between both sides of carrier 5 (differential between teller terminal side (B) and customer terminal side (A)) causes carrier 5 to travel within transmission conduit 20 in the direction of the negative pressure (e.g., toward customer terminal 14) as shown in FIGS. 4 and 5. As carrier 5 passes second blower 40 (FIG. 5), customer pressure sensor 95 detects a change in pressure within transmission conduit 20 and sends a control signal to stop the operation of second blower 40. As carrier 5 travels down transmission conduit 20, it traps a column of air between customer door 80 and itself, creating an air brake which slows carrier 5 down as it approaches customer terminal 14. As described above, carrier seals 8 may be configured to permit a controlled leaking of this column of air past carrier 5 from customer terminal side (A) to teller terminal side (B), which slowly drops carrier 5 down transmission conduit 20 into customer terminal 14 to rest on customer door 80.

Figure 6:
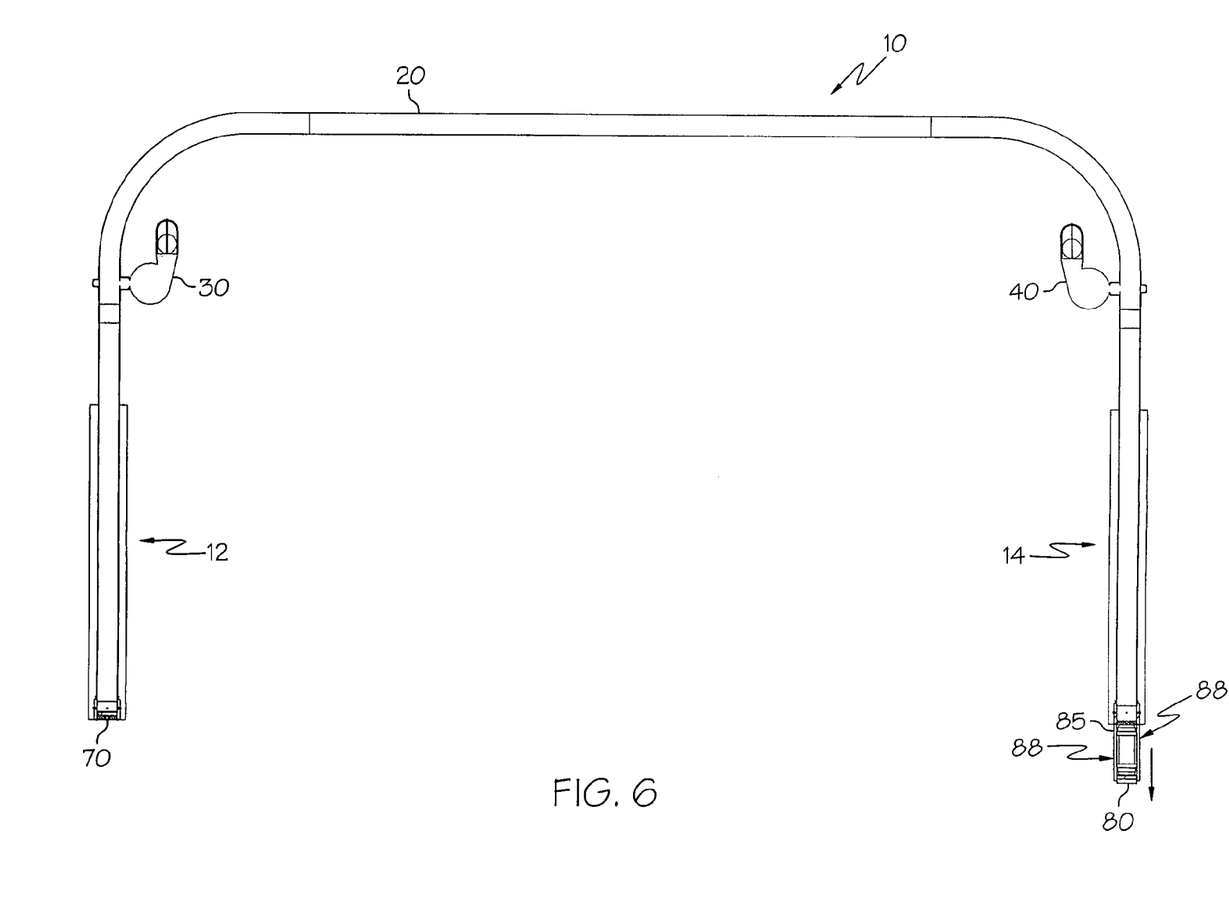
FIG. 6 is a schematic representation of the pneumatic transmission system illustrated in FIG. 1, showing the teller door in the "closed position, and the customer door in the "open" position for unloading and/or unloading of a carrier.

Referring to FIG. 6, once carrier 5 is at rest on customer door 80, the customer photo eye sensor detects carrier 5 and sends a control signal to operate customer door actuator 85. Customer door actuator 85 receives this signal and moves customer door 80 to the "open" position. For example, customer door 80 lowers from (and un-plugs from) customer opening 24 to lower carrier 5 sufficient enough that carrier 5 may be removed from pneumatic transmission system 10. Once customer door 80 is in the "open" position, a user at the customer terminal 14 may remove carrier 5 from customer terminal 14.

Figure 7:
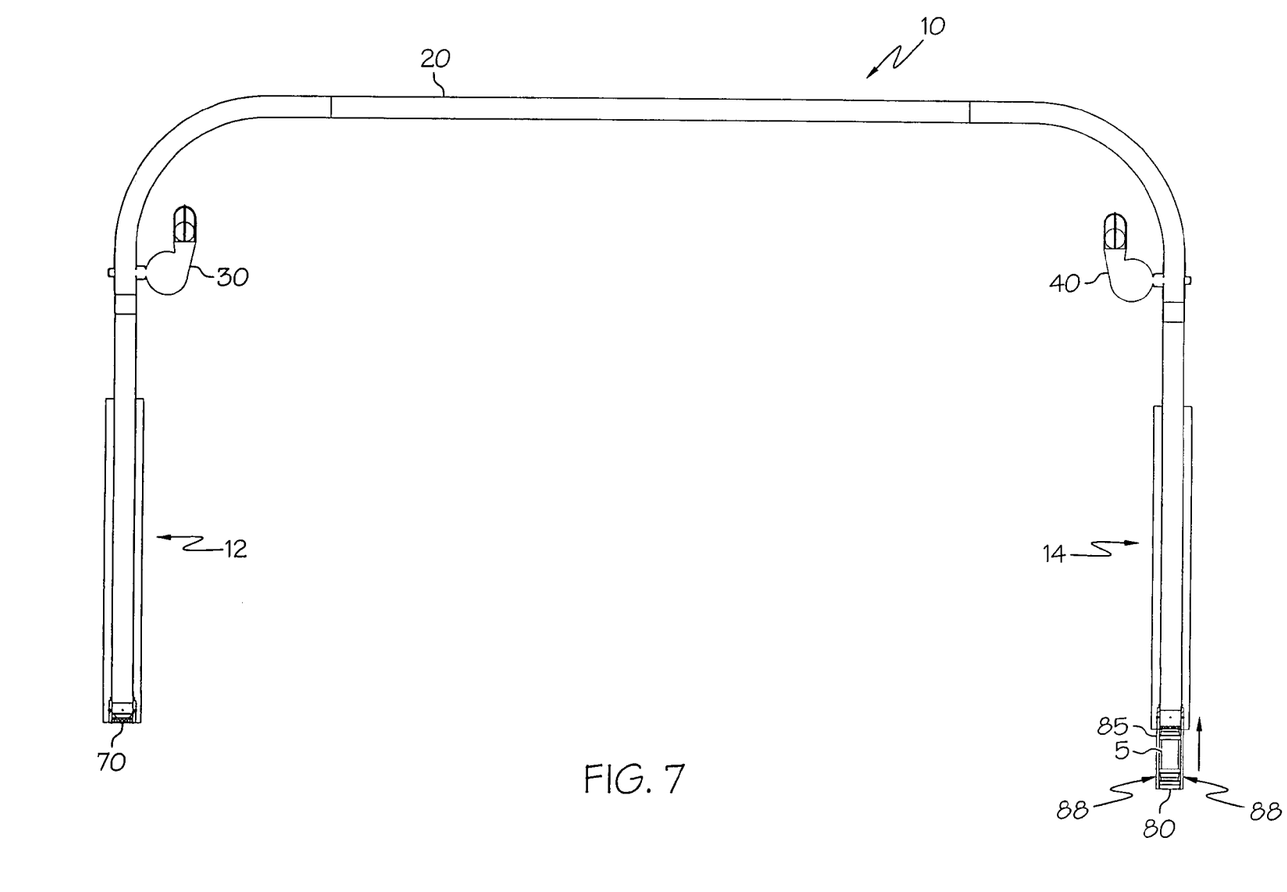
FIG. 7 is a schematic representation of the pneumatic transmission system illustrated in FIG. 1, showing the teller door in the "closed" position, and the customer door in the process of being moved from the "open" position to the "closed but vented" position.
Figure 8:
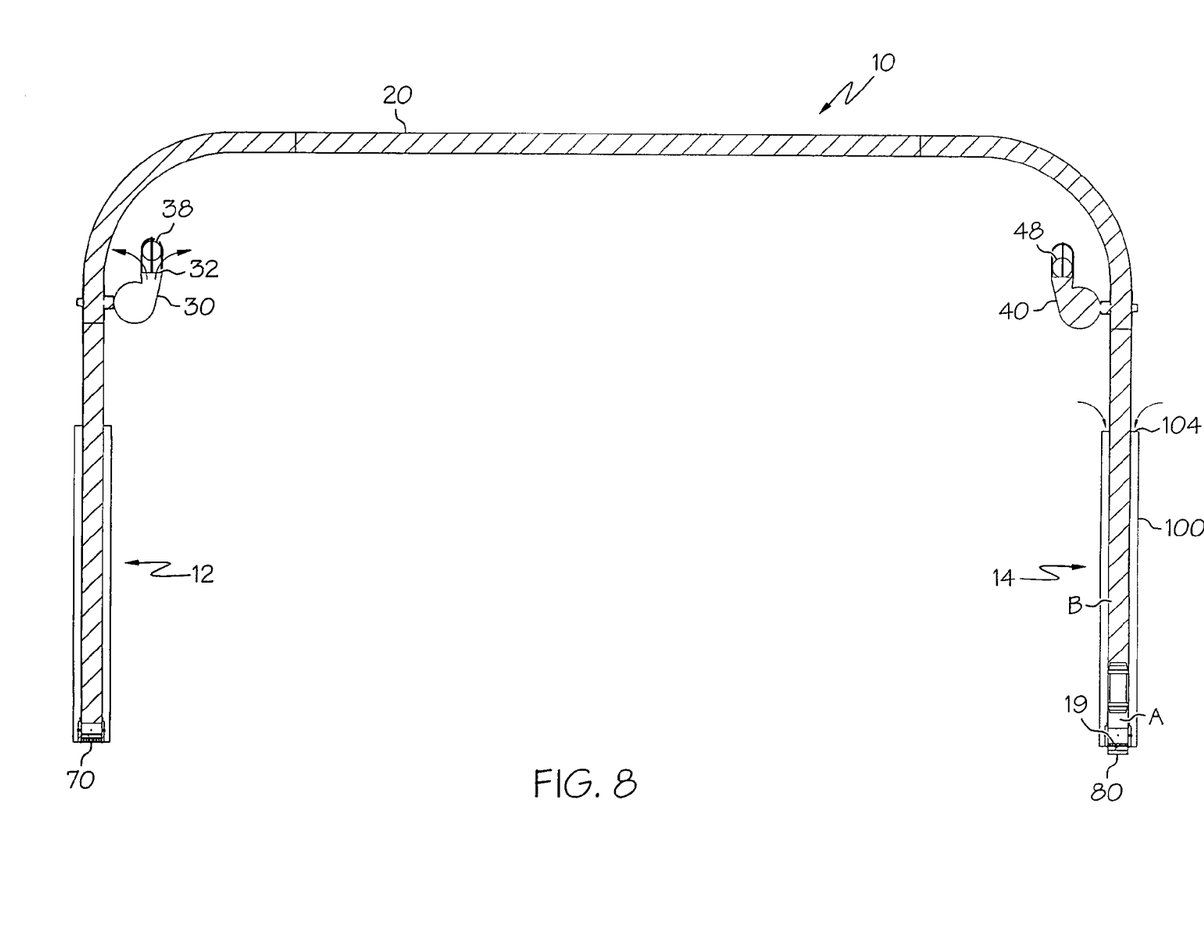
FIG. 8 is a schematic representation of the pneumatic transmission system illustrated in FIG. 1, showing the teller door in the "closed" position, and the customer door in the "closed but vented" position.

Referring to FIGS. 7 and 8, to send carrier 5 back to teller terminal 12 from customer terminal 14, a user at customer terminal 14 may place carrier 5 upon customer door 80 and activate pneumatic transmission system 10 (e.g., push a "send" button). Upon activation, teller end controller 110 may cause teller door actuator 75 to move teller door 70 to the "closed" position, and customer end controller 112 may cause customer door actuator 85 to move customer door 80 to the "closed but vented" position as shown in FIG. 8. When customer door 80 moves to the "closed but vented"

position, it inserts carrier 5 into teller opening 23 of transmission conduit 20 and is ready to be transmitted to teller terminal 12.

Teller end controller 110 may also activate first blower 30 to begin drawing a vacuum (e.g., negative pressure) in interior space 22 between teller door 70 and carrier 5 (teller terminal side (B)). Customer terminal port(s) 19 permit ambient air to enter transmission conduit 20 to create a positive pressure on the customer terminal side (A) of carrier 5 (e.g., between customer door 24 and carrier 5). The pressure differential that is formed on opposites sides of carrier 5 (e.g., negative pressure on teller terminal side (B) and positive pressure on customer terminal side(A)) causes carrier 5 to move toward teller terminal 12 (e.g., negative pressure side(B)) as shown in FIGS. 8 and 9.

Figure 9:
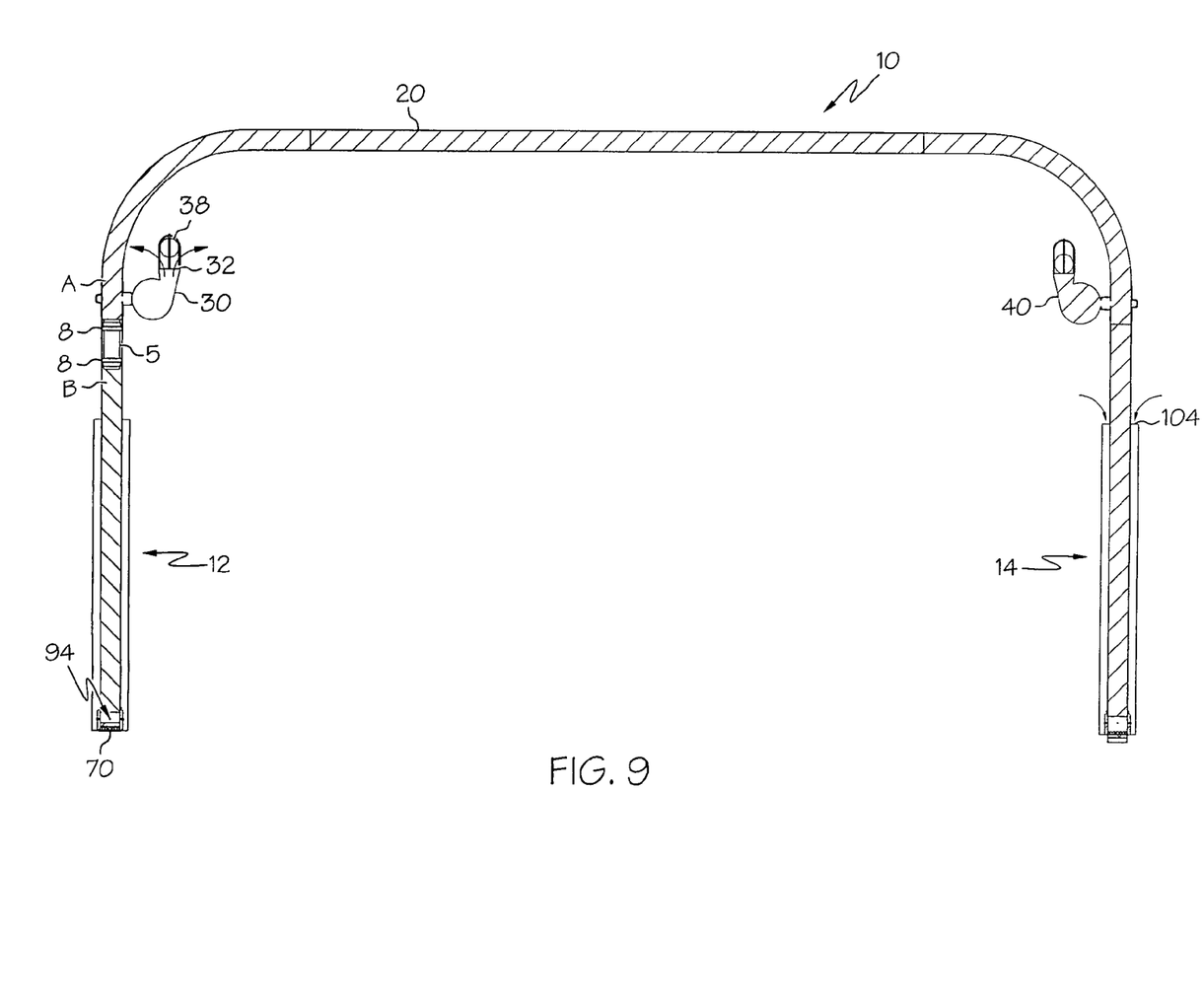
FIG. 9 is a schematic representation of the pneumatic transmission system illustrated in FIG. 1, showing a carrier traveling within the conduit just past the first blower.
Figure 10:
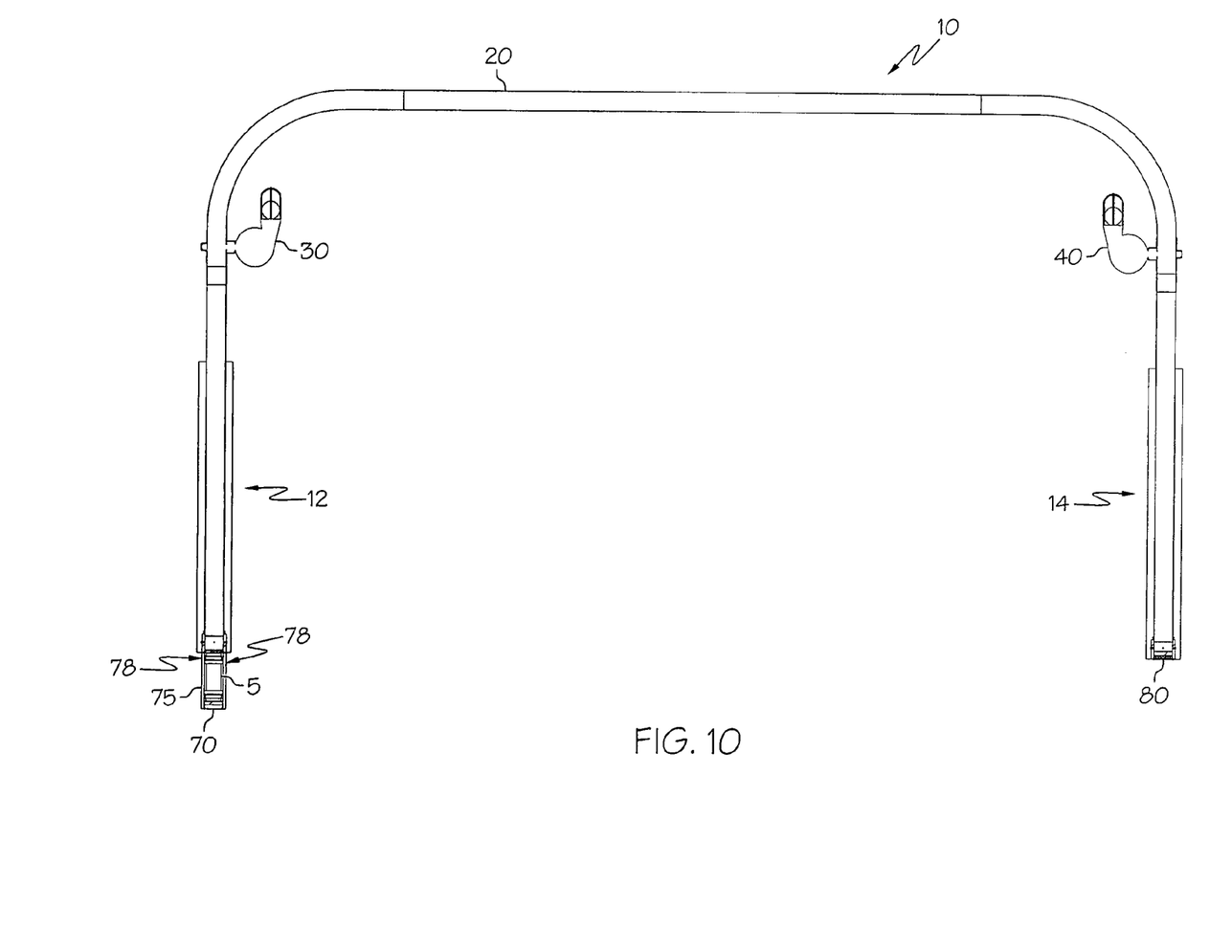
FIG. 10 is a schematic representation of the pneumatic transmission system illustrated in FIG. 1, showing the teller door in the "open" position for loading and/or unloading of a carrier, and the customer door in the "closed" position.

Referring to FIG. 9, when carrier 5 moves past first blower 30 within transmission conduit 20, teller pressure sensor 94 detects a change in pressure within transmission conduit 20 and stops (e.g., shuts off) first blower 30. As carrier 5 moves downward toward teller terminal 12, it traps a column of air within transmission conduit 20 between itself and teller door 70, providing an air brake that slows carrier 5 down as it approaches teller terminal 12. Carrier 5 slowly moves toward teller terminal 12 as some of the air from the column of air controllably leaks past carrier seals 8 (from B to A) until carrier 5 comes to rest upon teller door 70. Once the carrier comes to rest upon teller end door 70, the teller photo sensor (e.g., 90 and 92) detects the carrier's presence and sends a control signal to teller door actuator 75 to move teller door 70 to the "open" position (e.g., lower teller door 70 from teller opening 23 to "un-plug" it from teller opening 23) sufficient enough to permit the removal of carrier 5 from teller terminal 12 (FIG. 10), if desired.

Accordingly, while some of the alternative embodiments of the present invention have been discussed specifically; other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A pneumatic transmission system comprising:
   a first terminal;
   a second terminal;
   a transmission conduit connecting said first and second terminals in fluid communication with each other and having a first opening disposed at said first terminal and a second opening disposed at said second terminal;
   a first blower in fluid communication with said transmission conduit for creating a vacuum within said transmission conduit;
   a second blower in fluid communication with said transmission conduit for creating a vacuum within said transmission conduit;
   a first door connected to said first terminal for opening and closing said first opening; and
   a second door for opening and closing said second opening;
   wherein said transmission conduit comprises at least one venting port disposed within a sidewall of said transmission conduit at each of said first and second terminals, and wherein said first and second doors are movable to a position that closes respective said first and second openings but permit air to flow from outside said transmission conduit to an interior space of said transmission conduit through respective said at least one venting ports;
   wherein said transmission system transports a carrier within said transmission conduit between said first and second terminals.

2. The pneumatic transmission system according to claim 1, further comprising a first sensor operable to detect a presence of the carrier passing said first blower and a second sensor operable to detect a presence of the carrier passing said second blower such that said first and second sensors each are configured to generate a control signal to shut-off said first and second blowers, respectively, upon detection of the carrier.

3. The pneumatic transmission system according to claim 2, further comprising a controller in electrical communication with said sensors and said blowers.

4. The pneumatic transmission system according to claim 1, wherein said first and second blowers are directly connected to respective first and second connecting devices that are directly connected to said transmission conduit, placing said first and second blowers in fluid communication with said transmission conduit.

5. The pneumatic transmission system according to claim 1, wherein said first and second doors movable between three positions: closed; closed but vented; and opened.

6. A pneumatic transmission system comprising:
   a first terminal;
   a second terminal;
   a transmission conduit connecting said first and second terminals in fluid communication with each other;
   a first blower for creating a vacuum within said transmission conduit;
   a first connecting device directly connecting said first blower to said transmission conduit such that the first blower is in fluid communication with said transmission conduit;
   a second blower for creating a vacuum within said transmission conduit; and
   a second connecting device directly connecting said second blower to said transmission conduit such that the second blower is in fluid communication with said transmission conduit;
   wherein said transmission system transports a carrier disposed within said transmission conduit between said first and second terminals wherein said first and second terminals are each movable relative to said conduit between a closed position, a closed but vented position, and an open position.

7. The pneumatic transmission system according to claim 6, wherein said first and second connecting devices are banjo-style clamps.

8. The pneumatic transmission system according to claim 6, wherein said first blower comprises a first blower inlet and a first blower outlet, and wherein said first blower inlet is directly connected to said first connecting device and said first blower outlet comprises a check valve.

9. The pneumatic transmission system according to claim 8, wherein said second blower comprises a second blower inlet and a second blower outlet, and wherein said second blower inlet is directly connected to said second connecting device and said second blower outlet comprises a check valve.

10. The pneumatic transmission system according to claim 8, wherein said check valve comprises a ball and cage check valve.

11. The pneumatic transmission system according to claim 6, wherein said first blower is a tangential blower.

12. The pneumatic transmission system according to claim 6, further comprising a first end opening disposed in said transmission conduit at said teller terminal, a second end opening disposed in said transmission conduit at said customer terminal, a first door movingly connected to said first terminal, and a second door movingly connected to said second terminal; wherein said first and second doors are movable between a closed position, a closed but vented position, and an open position relative to said respective first and second end openings.

13. The pneumatic transmission system according to claim 6, further comprising a first door movingly connected to said first terminal, wherein said first door is substantially cylinder-shaped.

14. The pneumatic transmission system according to claim 6, further comprising a first door movingly connected to said first terminal, wherein said first door is a plug-type door operable to open and close a first end opening in said transmission conduit at said first terminal.

15. The pneumatic transmission system according to claim 6, wherein said first and second terminals each comprise a housing that encloses said transmission conduit at each of the terminals, said housing configured to permit air to flow through said housing into said transmission conduit through a venting port disposed through said transmission conduit at each of said first and second terminals.

16. A pneumatic transmission system comprising:
a transmission conduit;
a first end opening disposed in said transmission conduit;
a second end opening disposed in said transmission conduit opposite said first end opening;
a carrier disposed within said transmission conduit;
a first blower in fluid communication with said transmission conduit for transporting the carrier within said transmission conduit between said first and second end openings;
a first door movingly connected to said transmission conduit adjacent said first end opening; and
a second door movingly connected to said transmission conduit adjacent said second end opening;
wherein said first and second end doors are each movable relative to said respective first and second end openings between a closed position, a closed but vented position, and an open position.

17. The pneumatic transmission system according to claim 16, wherein each of said first and second doors comprise:
a door body having an outer face;
a seal disposed along said outer face, wherein said door and seal are configured to sealingly engage said end opening of said transmission conduit; and
an actuator connected to said door body and an end of said transmission conduit for moving said door body between said closed, closed but vented, and open positions with respect to said end.

18. The pneumatic transmission system according to claim 17, wherein said door body comprises a cylindrical shape.

19. The pneumatic transmission system according to claim 17, wherein said door body comprises a plug-type door.

20. The pneumatic transmission system according to claim 17, wherein said door body comprises a port for transmitting air into said pneumatic transmission conduit when said door body is moved to said closed but vented position.

21. The pneumatic transmission system according to claim 17, wherein said actuator is electrically coupled to a controller for controlling said movements of said actuator.

22. The pneumatic transmission system according to claim 21, wherein said controller comprises two microprocessors configured to provide distributed processing.

23. The end door assembly according to claim 17, wherein said seal comprises Velcro.

24. The end door assembly according to claim 16, wherein said transmission conduit includes a plurality of venting ports disposed therethrough adjacent said first and second end openings.

* * * * *